United States Patent
Lessi et al.

(10) Patent No.: US 7,582,138 B2
(45) Date of Patent: Sep. 1, 2009

(54) CARRIER-BOARD SYSTEM FOR THE PRODUCTION OF OXYGEN-ENRICHED GAS STREAMS AND METHOD FOR SUPPLYING THE AIRWAYS OF THE OCCUPANTS OF AN AIRCRAFT

(75) Inventors: Stéphane Lessi, Grenoble (FR); Nicolas Schmutz, Grenoble (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 325 days.

(21) Appl. No.: 10/551,601

(22) PCT Filed: Mar. 24, 2004

(86) PCT No.: PCT/FR2004/050123

§ 371 (c)(1),
(2), (4) Date: Sep. 30, 2005

(87) PCT Pub. No.: WO2004/089510

PCT Pub. Date: Oct. 21, 2004

(65) Prior Publication Data

US 2006/0249026 A1 Nov. 9, 2006

(30) Foreign Application Priority Data

Apr. 2, 2003 (FR) ................... 03 04106

(51) Int. Cl.
*B01D 53/047* (2006.01)
*B01J 20/18* (2006.01)

(52) U.S. Cl. ........................................ 95/96; 95/130

(58) Field of Classification Search .............. 95/90, 95/96, 127, 130, 902; 96/108; 502/60, 79; 423/700, 239.2; 128/204.18, 205.27
See application file for complete search history.

(56) References Cited

U.S. PATENT DOCUMENTS

| 3,331,190 A | | 7/1967 | Glew et al. | |
|---|---|---|---|---|
| 4,194,891 A | * | 3/1980 | Earls et al. | 95/98 |
| 4,566,881 A | | 1/1986 | Richter et al. | |
| 4,880,443 A | * | 11/1989 | Miller et al. | 95/98 |
| 5,531,807 A | * | 7/1996 | McCombs | 95/26 |
| 6,451,723 B1 | * | 9/2002 | Gaita et al. | 502/62 |
| 7,144,445 B2 | * | 12/2006 | Gueret et al. | 95/96 |

FOREIGN PATENT DOCUMENTS

| EP | 1 230 967 | 8/2002 |
|---|---|---|
| EP | 1 243 328 | 9/2002 |
| EP | 1 316 357 | 6/2003 |
| WO | WO 94 06541 | 3/1994 |
| WO | WO 00 40332 | 7/2000 |

OTHER PUBLICATIONS

International Search Report for PCT/FR04/050123.

* cited by examiner

*Primary Examiner*—Frank M Lawrence
(74) *Attorney, Agent, or Firm*—Christopher J. Cronin

(57) ABSTRACT

Apparatus and methods of supplying a highly enriched oxygen gas steam on board an aircraft. The gas stream is generated by an oxygen concentrator which concentrates atmospheric air by using at least one adsorber. The adsorber is made of a faujasite zeolite and has a Si/Al ratio between 1 and 1.5. The faujasite zeolite is also exchanged with silver by about 10%. Once generated, the gas stream is supplied to the airways of a person onboard an aircraft.

11 Claims, No Drawings

CARRIER-BOARD SYSTEM FOR THE PRODUCTION OF OXYGEN-ENRICHED GAS STREAMS AND METHOD FOR SUPPLYING THE AIRWAYS OF THE OCCUPANTS OF AN AIRCRAFT

BACKGROUND

The present invention relates to systems and methods of generating an oxygen-enriched gas stream from atmospheric air for delivery to the passengers and crew of an aircraft.

Oxygen concentrators on board aircraft, generally referred to by the acronym OBOGS, conventionally employ pressure swing adsorption (PSA or VPSA) processes that use adsorbents capable of separating the constituents of air.

It is known to use for this purpose adsorbents of the zeolite X or zeolite A type that have a high affinity for nitrogen and are therefore capable of delivering an oxygen-enriched mixture, but only up to a content not exceeding, at best, 95% because of the argon content present in the atmospheric air.

To deliver oxygen with a content greater than 95%, it has been proposed, for example in U.S. Pat. No. 4,566,881 (BWV), to use adsorbers in cascade, in arrangements that are ill-suited for onboard applications owing to their size, weight and circuit complexity.

Moreover, zeolites exchanged with silver cations have been known for a long time (cf. U.S. Pat. No. 3,331,190, Dow Chemical), which make it possible in particular to improve the separation of oxygen from nitrogen (cf. WO-A-00/40332, University of Michigan) or to separate argon from oxygen (cf. WO-A-94/06541, Arbor Research Corp.). However, there has been no suggestion as to the possible use of such adsorbents in OBOGS concentrators.

SUMMARY

The object of the present invention is to propose a method and an onboard system for generating a gas stream highly enriched with oxygen, which system is optimized in terms of onboard mass and onboard volume and is suitable for various types of aircraft, in particular for large-capacity civil aircraft in order to deliver substantial volumes of oxygen-enriched air to the occupants of the aircraft.

DESCRIPTION OF PREFERRED EMBODIMENTS

To do this, according to one feature of the invention, the onboard system for generating the oxygen-enriched gas stream from atmospheric air comprises at least one adsorber consisting of a faujasite zeolite having an Si/Al ratio between 1 and 1.5, advantageously between and 1 and 1.25, and exchanged to at least 10% with silver, advantageously between 20 and 60%, more particularly between 40 and 50%, with silver ions, the zeolite, advantageously consisting of fine particles of less than 0.8 mm in size, being for example an NaX zeolite, a CaX zeolite or preferably an LiX zeolite, advantageously an LiLSX zeolite exchanged to over 70% with lithium (lithium-exchanged zeolites, apart from their excellent performance in the separation of nitrogen, making it possible to minimize the levels of exchange with silver ions, the latter having a tendency, in the presence of lithium ions, to be fixed onto sites better targeted for the adsorption of argon), the degree of silver exchange then being between 20 and 30%. Advantageously, the zeolite is an LiAgLSX zeolite such that the sum $\alpha+\beta$, where $\alpha$ is the percentage of lithium and $\beta$ is the percentage of silver, is between 0.9 and 1.

The object of the invention is also to propose a method of generating a highly oxygen-enriched gas mixture from atmospheric air employing at least one system as defined below.

The system and the method according to the invention make it possible, under optimized operating conditions, to achieve oxygen concentrations of greater than 98%, typically around 99%, or even close to 100%, which therefore makes it possible to ensure excellent compatibility with the oxygen distribution lines on current aircraft, which are designed for oxygen purities of 100% (bottled oxygen). In addition, such an oxygen concentration level makes it possible to meet, without substantially modifying the operating conditions, the physiological requirement of aircraft crew or passengers at high flight altitudes, in which the oxygen content in the surrounding air is low, for example in the case of decompression at an altitude of 40,000 feet (12,000 m) or, more generally, above 30,000 feet (10,000 m).

The system proposed within the context of the present invention is therefore, according to a preferred embodiment, an OBOGS system of the VPSA (Vacuum Pressure Swing Adsorption) type comprising at least one pair of adsorbers operating alternately, in a speedy fashion, typically with a cycle (pressurization/generation/regeneration-elution sequence) lasting less than 12 seconds, typically between 6 and 10 seconds. With an LiAgLSX adsorbent having a mean particle size of less than 0.8 mm, preferably between 0.6 and 0.7 mm, exchanged to 80% with lithium and 20% with silver, for a civil airliner, typically carrying between 120 and 500 passengers, the amount of sieve per adsorber is between 1.5 and 15 kg, the high cycle pressure is between 500 millibar relative and 3 bar relative, and the low cycle pressure is correspondingly between 100 millibar relative and 1 bar relative. Thus, a highly oxygen-enriched gas mixture, with an oxygen content exceeding 97%, can be generated, including at high altitudes, allowing considerable dilution with the cabin air, thus permitting substantial volumes to be produced, suitable for a large number of passengers, even at high flight altitudes, the onboard VPSA system providing unlimited autonomy, allowing the aircraft to cruise at safety at high altitude, even in the event of a problem with the air pressurization system.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method which may be used for supplying an oxygen enriched gas stream on an aircraft, said method comprising:
    a) generating a highly enriched oxygen gas stream from atmospheric air with an oxygen concentrator consisting essentially of at least one pair of adsorbers, wherein:
        1) each of said adsorbers consists of a faujasite zeolite with a Si/Al ratio between about 1 and about 1.5;
        2) said faujasite zeolite is exchanged with silver to a degree between about 20% and 30%;
        3) said gas stream is generated by pressure swing adsorption;
        4) the desorption pressure is greater than about 0.100 bar relative;
        5) the cycle time is less than about 10 seconds;
        6) the oxygen content of said stream is greater than about 98%; and b) supplying said oxygen gas stream to the airways of at least one person on an aircraft.

2. The method of claim 1, wherein the air intake pressure is less than about 3 bar relative.

3. A method which may be used for supplying an oxygen enriched gas stream on an aircraft, said method comprising:
   a) generating a highly enriched oxygen gas stream from atmospheric air with an oxygen concentrator consisting essentially of at least one pair of adsorbers, wherein:
      1) each of said adsorbers consists of a faujasite zeolite with a Si/Al ratio between about 1 and about 1.5;
      2) said faujasite zeolite is exchanged with silver to a degree between about 20% and 30%;
      3) said gas stream is generated by pressure swing adsorption;
      4) said oxygen concentrator has an air intake pressure less than about 3 bar relative;
      5) said oxygen concentrator has a desorption pressure greater than about 0.100 bar relative;
      6) said oxygen concentrator has a cycle time less than about 10 seconds; and
      7) said gas stream has an oxygen content greater than about 98%; and
   b) supplying said oxygen gas stream to the airways of at least one person on an aircraft.

4. The method of claim 3, wherein said zeolite is a NaX zeolite.

5. The method of claim 3, wherein said zeolite is a LiX zeolite.

6. The method of claim 5, wherein the degree of exchange with lithium is greater than about 70%.

7. A method which may be used for supplying an oxygen enriched gas stream on an aircraft, said method comprising:
   a) generating a highly enriched oxygen gas stream from atmospheric air with an oxygen concentrator consisting essentially of at least one pair of adsorbers, wherein:
      1) each of said adsorbers consists of a faujasite zeolite with a Si/Al ratio between about 1 and about 1.5;
      2) said faujasite zeolite is exchanged with silver to a degree between about 20% and 30%;
      3) said gas stream is generated by vacuum pressure swing adsorption, wherein the cycle time is less than about 10 seconds and the oxygen content of said stream is greater than about 98%;
   b) supplying said oxygen gas stream to the airways of at least one person on an aircraft.

8. The method of claim 7, wherein the desorption pressure is greater than about 0.100 bar relative.

9. The method of claim 7, wherein the zeolite is an NaX zeolite.

10. The method of claim 7, wherein the zeolite is an LiX zeolite.

11. The method of claim 10, wherein the degree of exchange with lithium is greater than 70%.

* * * * *